(12) United States Patent
Sun et al.

(10) Patent No.: US 11,451,070 B2
(45) Date of Patent: Sep. 20, 2022

(54) CHARGING CIRCUIT, ELECTRONIC DEVICE, CHARGING METHOD AND CHARGING DEVICE

(71) Applicant: Beijing Xiaomi Mobile Software Co., Ltd., Beijing (CN)

(72) Inventors: Changyu Sun, Beijing (CN); Jie Fan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 167 days.

(21) Appl. No.: 16/888,053

(22) Filed: May 29, 2020

(65) Prior Publication Data
US 2021/0184475 A1 Jun. 17, 2021

(30) Foreign Application Priority Data

Dec. 13, 2019 (CN) .......................... 201911280493.8

(51) Int. Cl.
*H02J 7/00* (2006.01)
(52) U.S. Cl.
CPC .......... *H02J 7/0024* (2013.01); *H02J 7/0019* (2013.01); *H02J 7/0049* (2020.01)
(58) Field of Classification Search
USPC ......................................................... 320/125
See application file for complete search history.

(56) References Cited

U.S. PATENT DOCUMENTS

| | | | | |
|---|---|---|---|---|
| 5,818,200 A | * | 10/1998 | Cummings | ........... H02J 7/0036 |
| | | | | 320/116 |
| 5,955,867 A | * | 9/1999 | Cummings | ........... H02J 7/0024 |
| | | | | 320/107 |
| 6,504,344 B1 | | 1/2003 | Adams et al. | |
| 9,812,878 B1 | * | 11/2017 | Stieber | .................... H02J 7/007 |

(Continued)

FOREIGN PATENT DOCUMENTS

| | | |
|---|---|---|
| JP | 2001008373 A | 1/2001 |
| JP | 2009296820 A | 12/2009 |

(Continued)

OTHER PUBLICATIONS

European Search Report in European Application No. 20181651.9, dated Oct. 28, 2020.

(Continued)

*Primary Examiner* — Samuel Berhanu
(74) *Attorney, Agent, or Firm* — Finnegan, Henderson, Farabow, Garrett & Dunner, L.L.P.

(57) ABSTRACT

A charging circuit includes: an interface, a plurality of batteries connected in series, a first charging portion which is connected to the interface and is connected in series with the plurality of batteries, a second charging portion which is connected to the interface and is connected in series with at least one battery, and a first switching circuit which is connected with the second charging portion and is configured to switch a conducting state between the second charging portion and the at least one battery connected in series with the second charging portion, wherein when the (Continued)

first charging portion is in a charging state and the second charging portion is connected with the at least one battery, the charging circuit is switched to an asynchronous charging mode.

17 Claims, 12 Drawing Sheets

(56) References Cited

U.S. PATENT DOCUMENTS

| | | | | |
|---|---|---|---|---|
| 2010/0264879 A1* | 10/2010 | Lim | ...................... | H02J 7/0071 |
| | | | | 320/119 |
| 2011/0187309 A1* | 8/2011 | Chan | ..................... | H01M 10/46 |
| | | | | 320/101 |
| 2013/0207475 A1* | 8/2013 | Dong | ........................ | H02J 9/06 |
| | | | | 307/80 |
| 2014/0084598 A1* | 3/2014 | Albsmeier | ............ | H02J 7/1423 |
| | | | | 290/36 R |

FOREIGN PATENT DOCUMENTS

| | | | |
|---|---|---|---|
| JP | 2012524517 | A | 10/2012 |
| KR | 20140051948 | A | 5/2014 |
| KR | 101671551 | B1 | 11/2016 |
| KR | 20180051786 | A | 5/2018 |
| KR | 20190019148 | A | 2/2019 |
| WO | WO 2011142369 | A2 | 11/2011 |

OTHER PUBLICATIONS

Examination Report of Indian Application No. 202044027055, dated Jul. 12, 2021.
Notice of Reasons for Refusal of Japanese Application No. 2020-096654, dated Jul. 20, 2021.
Notification of Reason for Refusal dated Nov. 17, 2021, from the Korean Intellectual Property Office issued in counterpart Korean Application No. 10-2020-0059426.
Notice of Allowance dated Jan. 24, 2022, from the Korean Intellectual Property Office issued in counterpart Korean Application No. 10-2020-0059426.
Decision to Grant a Patent of Japanese Application No. 2020-096654, dated May 10, 2022.

* cited by examiner

CHARGING CIRCUIT, ELECTRONIC DEVICE, CHARGING METHOD AND CHARGING DEVICE

CROSS-REFERENCE TO RELATED APPLICATIONS

This application is based upon and claims priority to Chinese Patent Application No. 201911280493.8, filed on Dec. 13, 2019, the content of which is hereby incorporated by reference in its entirety.

BACKGROUND

As the function of intelligent terminals becomes more and more powerful, power consumption increases accordingly. Therefore, in order to meet the power consumption of the intelligent terminals and extend the endurance of the intelligent terminals, a plurality of batteries have been configured on some intelligent terminals to increase the battery capacity. However, increasing the number of batteries brings new challenges to the charging mode and charging efficiency of the batteries.

SUMMARY

According to a first aspect of embodiments of the disclosure, a charging circuit includes: an interface; a plurality of batteries connected in series; a first charging portion, wherein the first charging portion is connected to the interface and is connected in series with the plurality of batteries; a second charging portion, wherein the second charging portion is connected to the interface and is connected in series with at least one battery of the plurality of batteries, and a first switching circuit, wherein the first switching circuit is connected with the second charging portion and is configured to switch a conducting state between the second charging portion and the at least one battery, wherein in response to the first charging portion being in a charging state, and the second charging portion being connected with the at least one battery, the charging circuit is switched to an asynchronous charging mode in which the at least one battery is charged with a charging current different from that of one or more other batteries of the plurality of batteries.

According to a second aspect of embodiments of the disclosure, a charging method is applied to a charging circuit. The charging circuit includes a plurality of batteries connected in series. The charging method includes: acquiring an asynchronous charging instruction; and controlling at least one battery of the plurality of batteries and one or more other batteries of the plurality of batteries to perform asynchronous charging according to the asynchronous charging instruction, so that the at least one battery and the one or more other batteries are not in a maximum charging power stage at a same time.

According to a third aspect of embodiments of the disclosure, an electronic device includes: a processor; and a memory configured to store instructions executable by the processor, wherein the processor is configured to: acquire an asynchronous charging instruction; and control at least one battery of a plurality of batteries and one or more other batteries of the plurality of batteries to perform asynchronous charging according to the asynchronous charging instruction, so that the at least one battery and the one or more other batteries are not in a maximum charging power stage at a same time, wherein the plurality of batteries are connected in series.

According to a fourth aspect of embodiments of the disclosure, a computer-readable storage medium has stored therein instructions that, when executed by a processor of a device, cause the device to perform the method of the second aspect.

The technical solutions provided by the embodiments of the disclosure have the following beneficial effects:

In the embodiments, the charging circuit can asynchronously charge a plurality of batteries connected in series, thus, a user can select a synchronous charging mode or an asynchronous charging mode according to needs, so as to balance the charging duration and the heat generated by charging, and meet different needs of the user in different situations.

It should be understood that the above general description and the following detailed description are exemplary and explanatory only, and are not intended to limit the disclosure.

BRIEF DESCRIPTION OF THE DRAWINGS

The accompanying drawings are a part of this disclosure, and provide exemplary embodiments consistent with the disclosure and, together with the detailed description, serve to illustrate exemplary embodiments of the disclosure.

DETAILED DESCRIPTION

Figure 1:
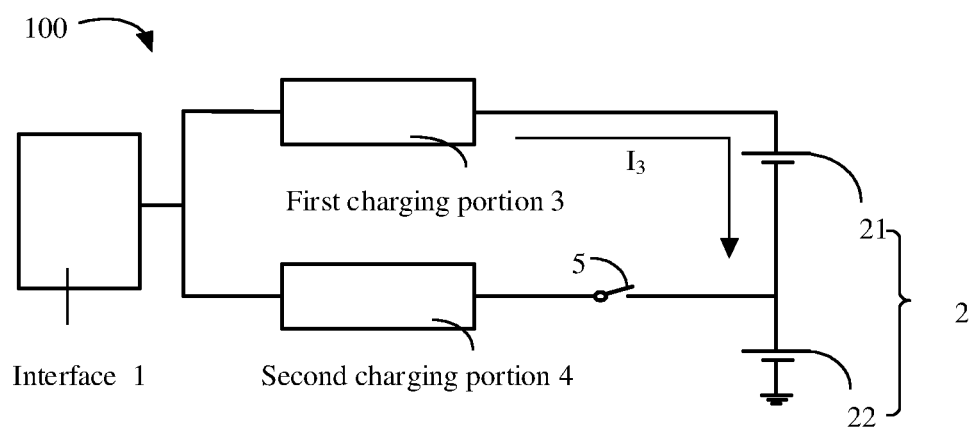
FIG. 1 is a schematic diagram of a charging circuit according to an exemplary embodiment.

Reference will now be made in detail to exemplary embodiments, examples of which are illustrated in the accompanying drawings. The following description refers to the accompanying drawings, in which identical or similar elements in different drawings are denoted by identical reference numerals unless indicated otherwise. The exemplary embodiments in the following description do not represent all embodiments consistent with the present disclosure. Instead, they are merely examples of apparatuses and methods consistent with aspects related to the present disclosure as recited in the appended claims.

Terms used in the disclosure are for the purpose of describing the exemplary embodiments only and are not intended to limit the disclosure. For example, the terms "first" and "second" may be used in the disclosure to describe various information, such information shall not be limited to these terms. These terms are used only to distinguish information of the same type from each other. For example, without departing from the scope of the disclosure, first information may also be referred to as second information. Similarly, second information may also be referred to as first information.

Figure 2:
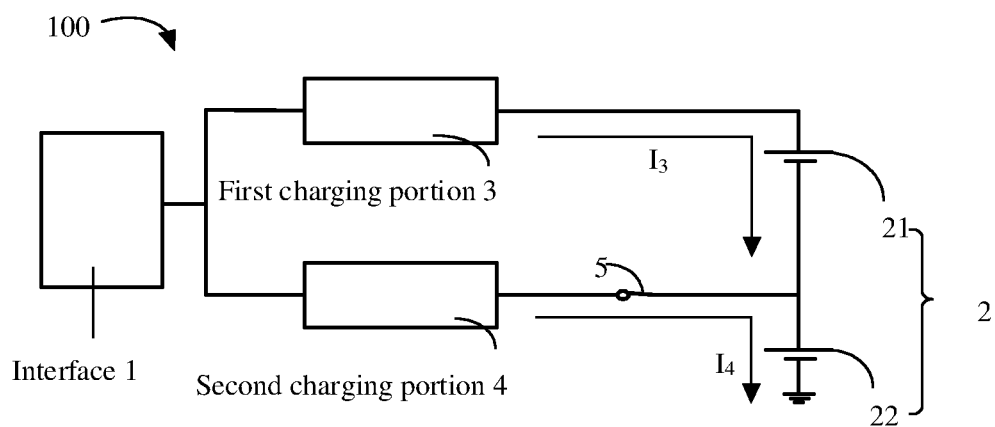
FIG. 2 is a schematic diagram of a charging circuit according to an exemplary embodiment.

FIG. 1 is a schematic diagram of a charging circuit 100 in a first state, according to an exemplary embodiment. FIG. 2 is a schematic diagram of the charging circuit 100 in a second state, according to an exemplary embodiment. As shown in FIG. 1 and FIG. 2, the charging circuit 100 may include an interface 1, a plurality of batteries 2, a first charging portion 3, and a second charging portion 4, wherein the plurality of batteries 2 are connected in series, the first charging portion 3 and the plurality of batteries 2 are connected in series, the second charging portion 4 and the first charging portion 3 are connected in parallel to the interface 1, and the interface 1 is configured to connect an external charging end. The charging circuit 100 may charge the plurality of batteries. Taking the embodiments in FIG. 1 and FIG. 2 as examples, the plurality of batteries 2 may include a first battery 21 and a second battery 22, wherein the first battery 21, the second battery 22, and the first charging portion 3 are connected in series. It can be understood that in other embodiments, the plurality of batteries 2 may also include three or more batteries, which is not limited in the disclosure.

The charging circuit 100 may also include a first switching circuit 5 which is connected with the second charging portion 4 and is configured to switch a conducting state between the second charging portion 4 and the battery connected in series with the second charging portion 4. As shown in FIG. 1 and FIG. 2, the second charging portion 4 is connected in series with the first switching circuit 5, and the second charging portion 4 is also connected in series with the second battery 22. As shown in FIG. 1, when the first switching circuit 5 is in an off state, the second charging portion 4 is disconnected with the second battery 22. As shown in FIG. 2, when the first switching circuit 5 is in an on state, the second charging portion 4 is connected with the second battery 22 is.

As shown in FIG. 1, when the first charging portion 3 is in a charging state and the second charging portion 4 is disconnected with the second battery 22, the charging current of the first battery 21 and the charging current of the second battery 22 are equal, and the charging current of the first battery 21 and the charging current of the second battery 22 are both equal to the output current $I_3$ of the first charging portion 3, and at this time, the charging circuit 100 is in a synchronous charging mode. As shown in FIG. 2, when the first charging portion 3 is in a charging state and the second charging portion 4 is connected with the second battery 22, the charging current of the first battery 21 is equal to the output current $I_3$ of the first charging portion 3, and the charging current of the second battery 22 is equal to the sum of the output current $I_3$ of the first charging portion 3 and the output current I4 of the second charging portion 4. In the embodiment in FIG. 2, the charging currents of the two batteries are not equal to each other. In other embodiments, a plurality of batteries, such as more than 2 batteries, may also be connected in series with the second charging portion 4. At this time, the charging current of the one or more batteries connected in series with the first charging portion 3 is different from the charging current of the one or more batteries connected in series with the second charging portion 4. That is, when the charging circuit 100 is in an asynchronous charging mode, the charging current of at least one battery is different from the charging currents of other batteries.

In the above embodiments, the charging circuit can asynchronously charge a plurality of batteries connected in series, thus, a user can select, according to needs, the synchronous charging mode or the asynchronous charging mode, so as to balance the charging duration and the heat generated by charging and meet different needs of the user in different situations. For example, when the user wishes to charge for a shorter time, the synchronous charging mode can be adopted, and at this time, the heat generated by charging is larger. When the user has no restriction on the charging time or is not in a hurry to use an electronic device, the asynchronous charging mode can be adopted so as to avoid charging of a plurality of batteries at the same time period with maximum charging power, reduce the heat generated by charging, and reduce the design difficulty of thermal stacking.

Figure 3:
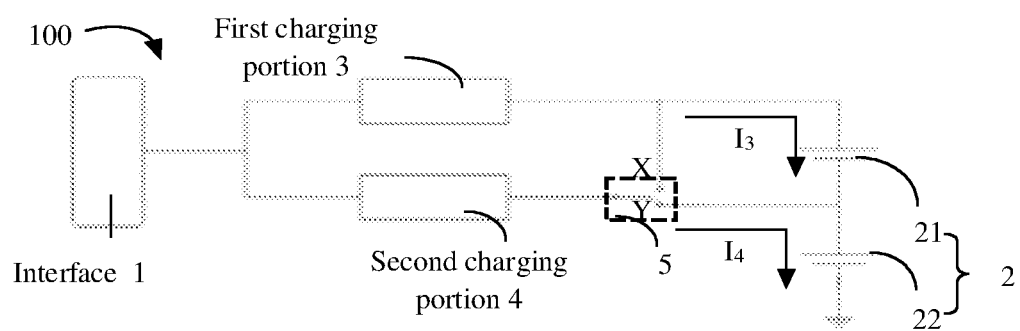
FIG. 3 is a schematic diagram of a charging circuit according to an exemplary embodiment.
Figure 4:
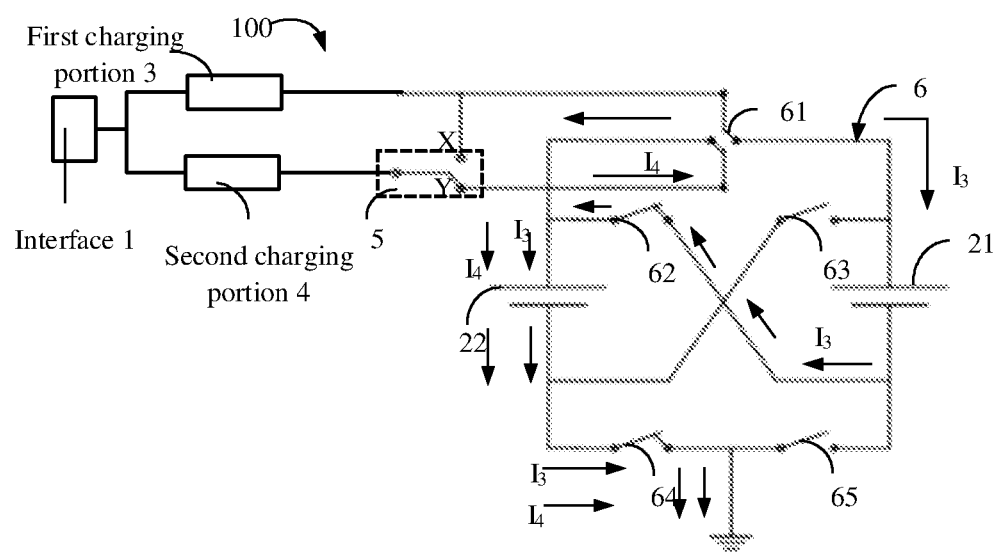
FIG. 4 is a schematic diagram of a charging circuit according to an exemplary embodiment.
Figure 5:
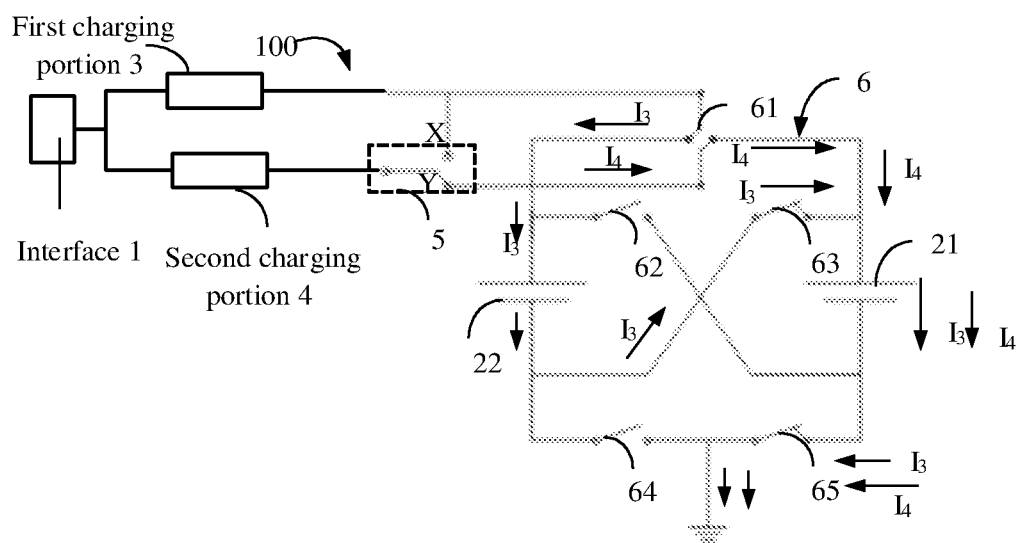
FIG. 5 is a schematic diagram of a charging circuit according to an exemplary embodiment.

As shown in FIG. 1 and FIG. 2, the first switching circuit 5 may include a single-pole single-throw switch, and a conducting state between the second charging portion 4 and the battery connected in series with the second charging portion 4 may be implemented through the single-pole single-throw switch. Alternately, as shown in FIG. 3 to FIG. 5, the first switching circuit 5 may also include a single-pole multi-throw switch. When the single-pole multi-throw switch is connected to the point Y, a connection between the second charging portion 4 and the battery connected in series with the second charging portion 4 is in an on state. When the single-pole multi-throw switch is connected to point X, a connection between the second charging portion 4 and the battery connected in series with the second charging portion 4 is in an off state. Further, the current output by the first charging portion 3 can flow in a direction indicated by an arrow in FIG. 3, through the second switching circuit 6 as shown in FIG. 4 and FIG. 5. The situation will be described in detail below.

As shown in FIG. 4 and FIG. 5, the charging circuit 100 may also include a second switching circuit 6. The second switching circuit 6 is connected with both the first charging portion 3 and the second charging portion 4. Furthermore, when the charging circuit 100 is in an asynchronous charging mode, the second switching circuit 6 is configured to adjust the magnitude of the charging current for each battery (or each battery pack) according to the current change condition of each battery (or each battery pack). When one battery (or one battery pack) is charged with a heavy current to a constant voltage stage, a low current may be adjusted to charge the battery (or the battery pack) that is about to be fully charged, and a heavy current is adopted to charge the battery (or battery pack) that are not fully charged, thereby avoiding the time periods of the maximum charging power of the plurality of batteries, and reducing heat dissipation.

Figure 6:
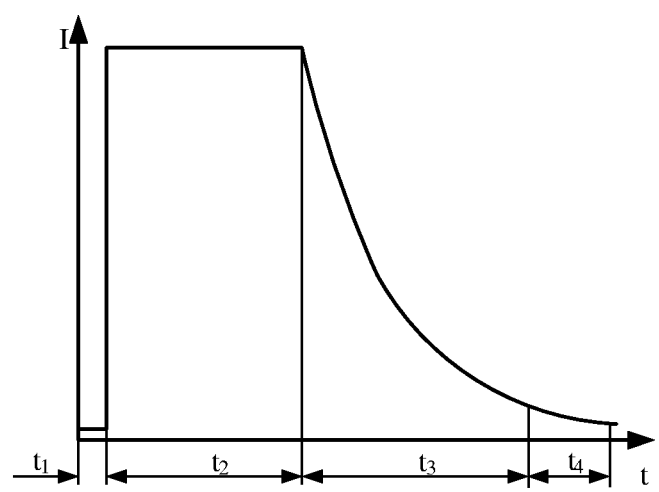
FIG. 6 is a time-current curve diagram when a lithium battery is charged in prior art.

Before describing the embodiments shown in FIG. 4 and FIG. 5 in detail, FIG. 6 shows a time-current curve diagram when a lithium battery is charged in the related technologies, wherein the abscissa is time, and the ordinate is current value. In a stage $t_1$, trickle charging may be performed on the lithium battery, and the current is smaller in the trickle charging stage. When the voltage of the lithium battery reaches a threshold, the charging current may be increased, constant current charging is performed on the lithium battery in a time period $t_2$, and this stage has the highest charging efficiency. When the voltage of the lithium battery reaches another threshold, the charging current may be reduced, and the lithium battery enters a constant voltage charging stage in a time period $t_3$ and finally enters a charging termination stage in a time period $t_4$.

Referring back to the embodiments as shown in FIG. 4 and FIG. 5, the plurality of batteries 2 may form a first battery pack and a second battery pack, and each battery pack may include at least one battery. As shown in FIG. 4 and FIG. 5, the first battery 21 may form the first battery pack, and the second battery 22 may form the second battery pack. In other embodiments, a first battery pack of a plurality of batteries may also be included, and the first battery pack is connected in series with the first charging portion 3 and is connected in parallel with the second charging portion 4.

Further, the second switching circuit 6 may include a first switch 61, a second switch 62, a third switch 63, a fourth switch 64, and a fifth switch 65, wherein the first switch 61 may have a first on state and a second on state; one end of the second switch 62 is connected to the positive electrode of the second battery 22, and the other end of the second switch 62 is grounded through the fifth switch 65; one end of the third switch 63 is connected to the negative electrode of the second battery 22, and the other end of the third switch 63 is connected to the positive electrode of the first battery 21; one end of the fourth switch 64 is connected to the negative electrode of the second battery 22, and the other end of the fourth switch 64 is grounded; and one end of the fifth switch 65 is connected to the negative electrode of the first battery 21, and the other end of the fifth switch 65 is grounded.

When the first switch 61 is switched to the first on state as shown in FIG. 4, the second switch 62 and the fourth switch 64 are switched to an on state, and the third switch 63 and the fifth switch 65 are switched to an off state. At this time, the first charging portion 3, the first battery 21, the second switch 62, the second battery 22, and the fourth switch 64 constitute a first charging loop, and the charging current in the first charging loop is equal to the output current $I_3$ of the first charging portion 3; and the second charging portion 4, the second battery 22, and the fourth switch 64 constitute a second charging loop, and the charging current in the second charging loop is equal to the output current $I_4$ of the second charging portion 4. It can be seen that the charging current input to the first battery 21 is equal to $I_3$, and the charging current input to the second battery 22 is equal to $I_3+I_4$. At this time, the charging power of the second battery 22 is greater than the charging power of the first battery 21.

In a constant current charging stage, the second battery 22 may be charged with a heavy current of $I_3+I_4$. With the progress of the charging process, the second battery 22 gradually becomes full, the charging current of the second battery 22 will gradually decrease, and since the first battery 22 begins to enter the constant current charging stage, the charging current of the first battery 22 gradually increases. At this time, the first switch 61 may be switched from the first on state to the second on state to reduce the charging current input to the second battery 22, the second battery 22 is switched to the constant voltage charging stage to increase the charging current input to the first battery 21, and the first battery 21 is switched to the constant current charging stage. It can be understood that in order to improve the safety of the charging process, when the second battery 22 is in the constant current charging stage, the charging current of $I_3+I_4$ should be less than or equal to the maximum charging current that the second battery 22 can withstand.

When the first switch 62 is switched to the second on state as shown in FIG. 5, the second switch 62 and the fourth switch 64 are switched to an off state, and the third switch 63 and the fifth switch 65 are switched to an on state. At this time, the first charging portion 3, the second battery 22, the third switch 63, the first battery 21 and the fifth switch 65 constitute a third charging loop, and the charging current in the third charging loop is equal to the output current $I_3$ of the first charging portion 3; and the second charging portion 4, the first battery 21 and the fifth switch 65 constitute a fourth charging loop, and the charging current in the fourth charging loop is equal to the output current $I_4$ of the second charging portion 4. It can be seen that the charging current input to the first battery 21 is equal to $I_3+I_4$, and the charging current input to the second battery 22 is equal to $I_3$. At this time, the charging power of the second battery 22 is greater than the charging power of the first battery 21. It can be understood that in order to improve the safety of the charging process, when the first battery 21 is in the constant current charging stage, the charging current of $I_3+I_4$ should be less than or equal to the maximum charging current that the first battery 21 can withstand.

Further, since the charging stage of the second battery 22 is ahead of the charging stage of the first battery 21, the second battery 22 will complete charging before the first battery 21; and when the second battery 22 is nearly full, the first charging portion 3 independently supplies power to the second battery 22. Therefore, the first charging portion 3 and the second charging portion 4 may be electrically connected through an I2C bus. One of the first charging portion 3 and the second charging portion 4 is a main management portion, and the other one is an auxiliary management portion. When the second battery 22 completes charging, the main management portion generates a charging stop instruction, the first charging portion 3 may adjust the output current to zero according to the charging stop instruction to stop charging the second battery 22, and at this time, the first battery 21 may be separately charged by the second charging portion 4. When the second battery 22 is nearly full, the first battery 21 has been charged for a long period of time with a heavy current $I_3+I_4$, and the first battery 21 is near the constant voltage charging stage or is already in the constant voltage charging stage, so the first charging portion 3 stops working at this time, and the charging duration is not prolonged.

For example, the first charging portion 3 may be taken as an auxiliary charging portion, and the second charging portion 4 may be taken as a main charging portion. Therefore, the second charging portion 4 may generate a charging stop instruction, and further, an I2C bus sends the charging stop instruction to the first charging portion 3, so that the first charging portion 3 stops outputting current. In other embodiments, the first charging portion 3 may also be taken as a main charging portion, and the second charging portion 4 may also be taken as an auxiliary charging portion, which is not limited in the disclosure.

In the embodiments of the disclosure, a user may asynchronously charge the first battery 21 and the second battery 22 when the voltages of both the first battery 21 and the second battery 22 are lower than a preset threshold. At this time, the first switch 61 may be switched to the first on state, the output current of the first charging portion 3 is adjusted to zero, and the second battery 22 is pre-charged by the second charging portion 4. The preset threshold may be 3V. When the voltages of the first battery 21 and the second battery 22 are lower than 3V, the residual electricity of the first battery 21 and the residual electricity of the second battery 22 are less, therefore, the time periods of the maximum charging power of the first battery 21 and the second battery 22 may be staggered by charging the second battery 22 first and then charging the first battery 21.

Further, the first charging portion 3 and the second charging portion 4 may be electrically connected through an I2C bus. One of the first charging portion 3 and the second charging portion 4 is a main management portion, and the other one is an auxiliary management portion. When the charging current of the second battery 22. reaches the maximum, it can be considered that the second battery 22 starts to enter the constant current charging stage, therefore, the main charging portion may generate a charging instruction which may be configured to instruct the first charging portion 3 to pre-charge the first battery 21, and at this time, the first switch 61 is in a first on state.

In the embodiments of the disclosure, the first charging portion 3 is connected in series with a plurality of batteries, the second charging portion 4 is also connected in series with a plurality of batteries, and the number of the batteries connected in series with the first charging portion 3 may be different from the number of the batteries connected in series with the second charging portion 4, and the first charging portion 3 and the second charging portion 4 are connected in parallel to the same interface 1, so that the input voltage of the first charging portion 3 is equal to the input voltage of the second charging portion 4. The ratio of the output voltage of the first charging portion 3 to the output voltage of the second charging portion 4 may be equal to the ratio of the number of the batteries connected in series with the first charging portion 3 to the number of the batteries connected in series with the second charging portion 4, to achieve double voltage charging.

With the increase of the service life of the electronic device, each battery pack may have different losses, for example, in battery capacity, and battery charging and discharging efficiency. Therefore, to obtain the aging condition of each battery pack is conducive to the battery self-inspection performed by the electronic device and the setting of appropriate charging plan. In the embodiments of the disclosure, since each battery pack and other battery packs may be charged asynchronously, any charging management portion can obtain the time required for each battery pack to complete a charging cycle, determine the aging state of each battery pack, and improve the charging and discharging safety performance.

Figure 7:
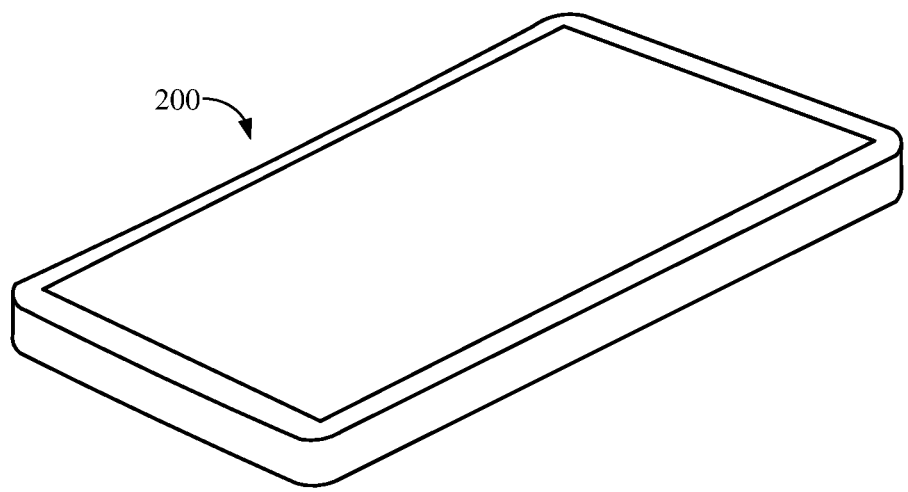
FIG. 7 is a schematic diagram of an electronic device according to an exemplary embodiment.

FIG. 7 is a schematic diagram of an electronic device 200 according to an exemplary embodiment. The device 200 may include the charging circuit 100 as described in any one of the above embodiments. The electronic device 200 may be an intelligent device such as a mobile phone terminal or a tablet computer terminal.

Figure 8:
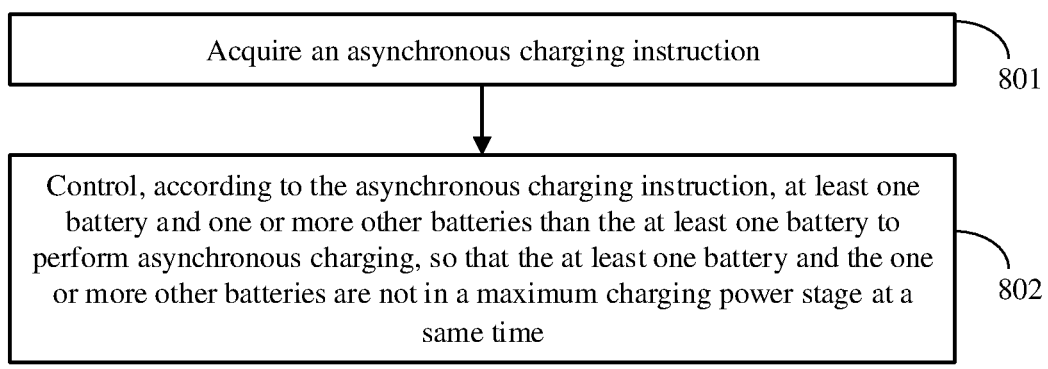
FIG. 8 is a flowchart of a charging method according to an exemplary embodiment.

FIG. 8 is a flow chart of a charging method applied to a charging circuit, according to an exemplary embodiment. The charging circuit includes a plurality of batteries connected in series. As shown in FIG. 8, the charging method may include the following operations.

In operation 801, an asynchronous charging instruction is acquired.

In the embodiment, the asynchronous charging instruction may be generated based on user operation, or may be a default charging instruction in the electronic device 200, or may be generated by the electronic device 200 according to a current application scene, which is not limited in the disclosure.

In operation 802, at least one battery and one or more other batteries than the at least one battery are controlled to perform asynchronous charging according to the asynchronous charging instruction, so that the at least one battery and the other batteries are not in a maximum charging power stage at the same time.

In the present embodiment, by staggering the time period of the maximum charging power of at least one battery from the time period of the maximum power of other batteries, the batteries connected in series being in a maximum charging power stage at the same time can be avoided, thermal stacking is reduced, and the requirement for output power of an output end is reduced.

Further, charging instructions may also be acquired. The charging instructions may include an asynchronous charging instruction and a synchronous charging instruction. The type of the charging instruction is judged and, if the charging instruction is the asynchronous charging instruction, at least one battery and one or more other batteries are controlled to perform asynchronous charging, and if the charging instruction is the synchronous charging instruction, the plurality of batteries are controlled to perform synchronous charging.

For example, the asynchronous charging may refer to the following mode: at the initial stage of charging, the at least one battery may be pre-charged while the one or more other batteries are not charged; subsequently, as the charging process of the at least one battery advances, the voltages of two ends of the at least one battery gradually increase, so that whether the at least one battery is in a constant current charging stage may be judged by voltage values; when the at least one battery is in the constant current charging stage, pre-charging of the one or more other batteries is controlled according to the preset asynchronous charging strategy; as the asynchronous charging process advances, the voltages of the at least one battery will continue to increase, so that whether the at least one battery is in a constant voltage charging stage may be judged by judging the voltages of the two ends of the at least one battery; when the at least one battery is in the constant voltage charging stage, other batteries are controlled to enter the constant current charging stage according to the preset asynchronous charging strategy; and finally, after the at least one battery is fully charged, the one or more other batteries may be charged with a low current until the other batteries are fully charged.

Since the charging power in the constant current charging stage is generally larger, in the present embodiment, the constant current charging stage of the at least one battery and the constant current charging stage of the one or more other batteries may be staggered to achieve the purpose that the time periods of the maximum charging power do not coincide.

Corresponding to the embodiments of the above charging method, the disclosure further provides embodiments of a charging device.

Figure 9:
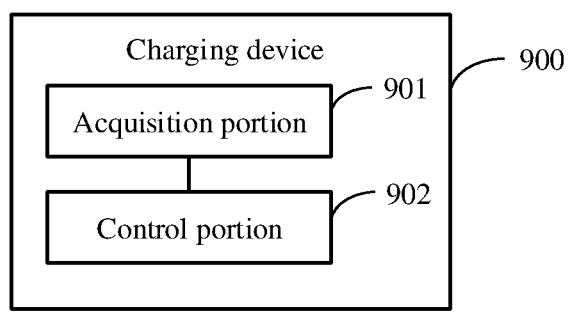
FIG. 9 is a block diagram of a charging device according to an exemplary embodiment.

FIG. 9 is a block diagram of a charging device 900 according to an exemplary embodiment. The device 900 is applied to a charging circuit, and the charging circuit includes a plurality of batteries connected in series. Referring to FIG. 9, the device 900 includes an acquisition portion 901 and a control portion 902. The acquisition portion 901 is configured to acquire an asynchronous charging instruction. The control portion 902 is configured to control at least one battery of the plurality of batteries and one or more batteries, other than the at least one battery, of the plurality of batteries to perform asynchronous charging according to the asynchronous charging instruction, so that the at least one battery and the one or more other batteries are not in a maximum charging power stage at the same time.

Figure 10:
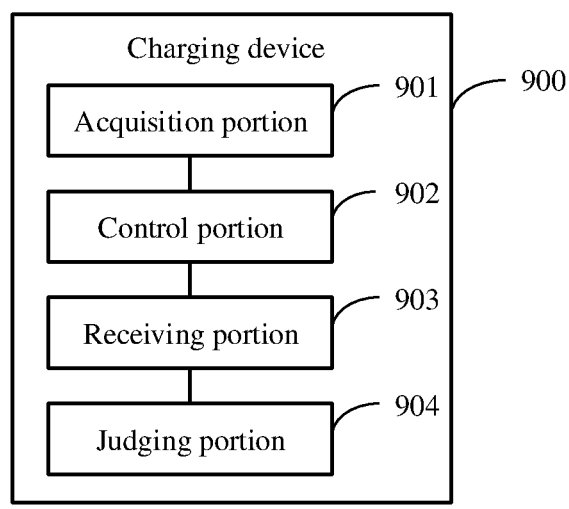
FIG. 10 is a block diagram of a charging device according to an exemplary embodiment.

FIG. 10 is a block diagram of the charging device 900 according to an exemplary embodiment. On the basis of the embodiment in FIG. 9, the device 900 in FIG. 10 further includes a receiving portion 903 and a judging portion 904. The receiving portion 903 is configured to receive charging instructions which include the asynchronous charging instruction and a synchronous charging instruction. The judging portion 904 is configured to judge the type of the charging instruction. The charging instruction is the asynchronous charging instruction, the at least one battery and the one or more other batteries are controlled to perform asynchronous charging, and if the charging instruction is the synchronous charging instruction, the plurality of batteries are controlled to perform synchronous charging.

Figure 11:
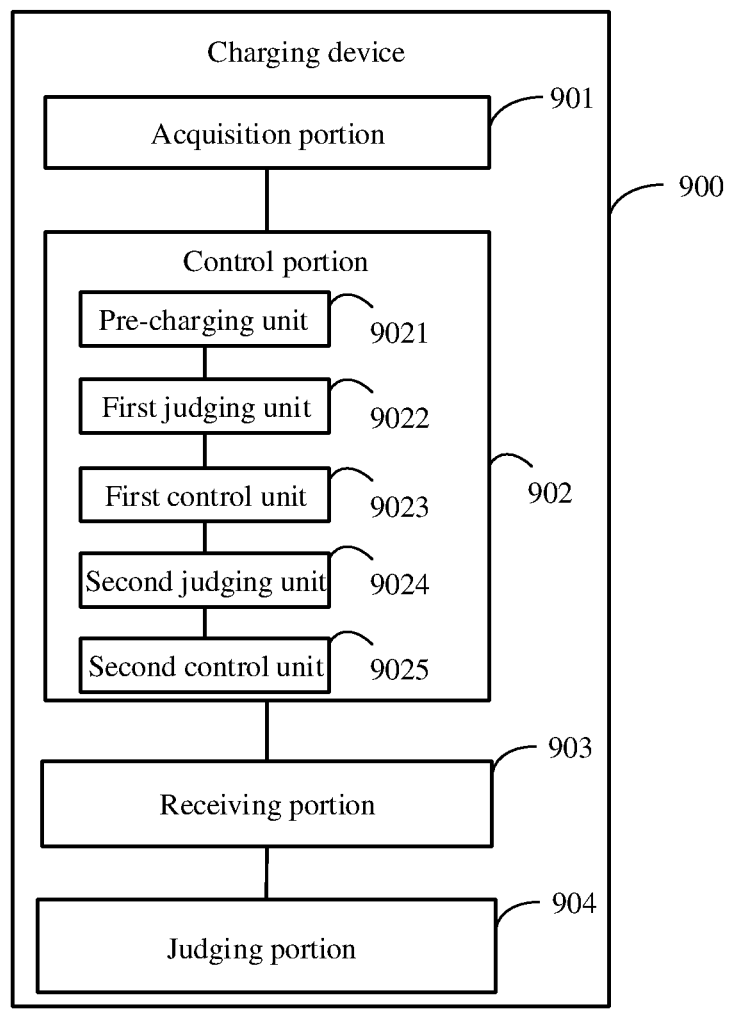
FIG. 11 is a block diagram of a charging device according to an exemplary embodiment.

FIG. 11 is a block diagram of the charging device 900 according to an exemplary embodiment. On the basis of the embodiment in FIG. 9, the control portion 902 further includes: a pre-charging unit 9021 configured to pre-charge the at least one battery; a first judging unit 9022 configured to judge whether the at least one battery is in a constant current charging stage; a first control unit 9023 configured to control pre-charging of the one or more batteries according to the preset asynchronous charging strategy when the at least one battery is in the constant current charging stage; a second judging unit 9024 configured to judge whether the at least one battery is in a constant voltage charging stage; and a second control unit 9025 configured to control the one or more other batteries to enter the constant current charging stage according to the preset asynchronous charging strategy when the at least one battery is in the constant voltage charging stage.

With respect to the device in the above embodiments, the specific manners for performing operations by individual portions therein have been described in detail in the method embodiments, which will not be repeated herein.

The disclosure further provides a charging device applied to a charging circuit. The charging circuit includes a plurality of batteries connected in series. The charging device includes: a processor, and a memory configured to store executable instructions of the processor, wherein the processor is configured to acquire an asynchronous charging instruction, and control at least one battery and one or more other batteries than the at least one battery to perform asynchronous charging according to the asynchronous charging instruction, so that the at least one battery and the one or more other batteries are not in a maximum charging power stage at the same time.

The disclosure also provides a terminal including a charging circuit. The charging circuit includes a plurality of batteries connected in series. The terminal further includes a processor and a memory storing instructions. The processor is configured to execute the instructions to perform the following operations: acquiring an asynchronous charging instruction; and controlling at least one battery and one or more other batteries than the at least one battery to perform asynchronous charging according to the asynchronous charging instruction, so that the at least one battery and the one or more other batteries are not in a maximum charging power stage at the same time.

Figure 12:
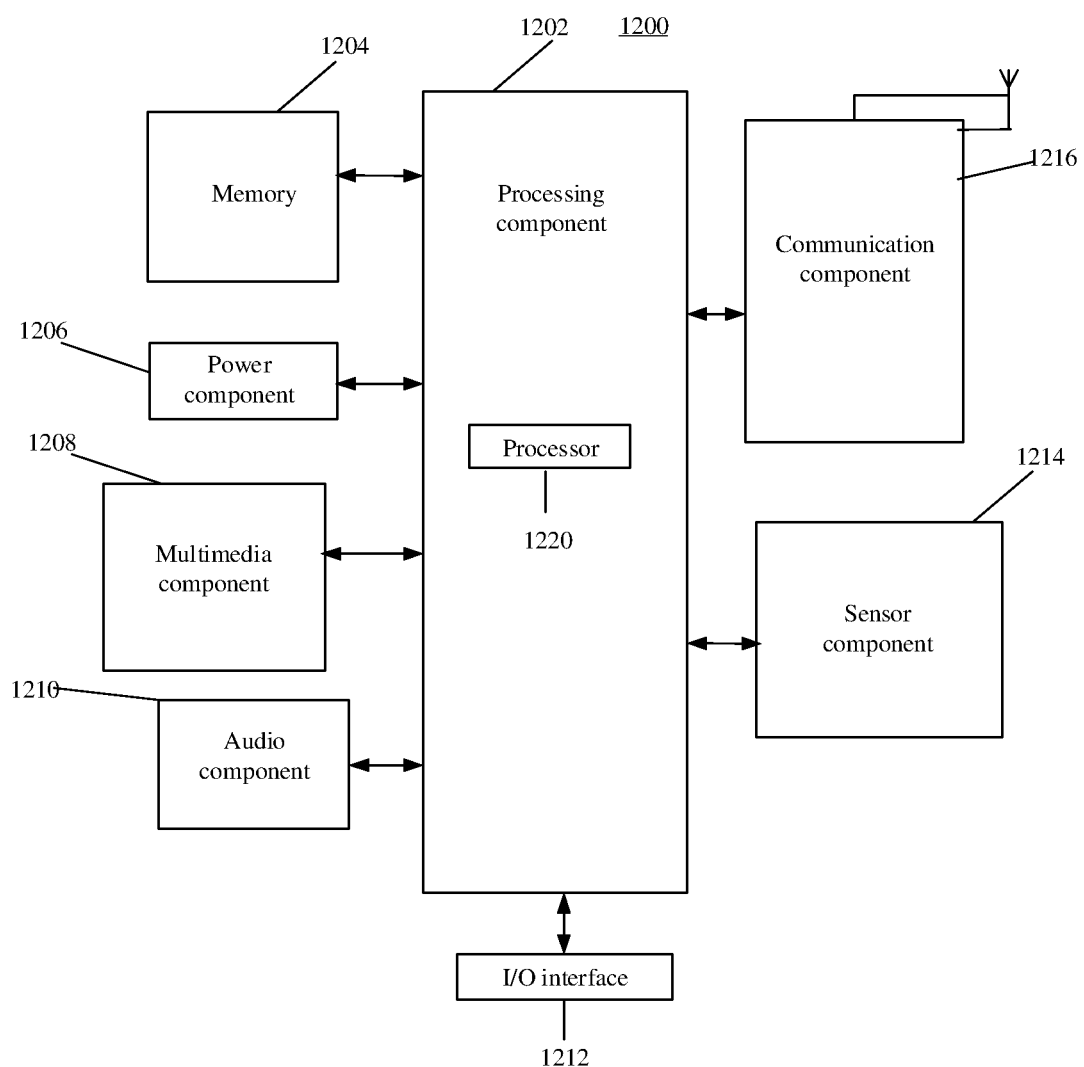
FIG. 12 is a schematic diagram of a charging device according to an exemplary embodiment.

FIG. 12 is a schematic diagram for a charging device 1200 according to an exemplary embodiment. For example, the device 1200 may be a mobile phone, a computer, a digital broadcasting terminal, a message transceiver device, a game console, a tablet device, a medical device, a fitness device, a personal digital assistant, and the like.

Referring to FIG. 12, the device 1200 may include one or more of the following components: a processing component 1202, a memory 1204, a power component 1206, a multimedia component 1208, an audio component 1210, an Input/Output (I/O) interface 1212, a sensor component 1214, and a communication component 1216.

The processing component 1202 generally controls the overall operation of the device 1200, such as operations associated with display, telephone calls, data communication, camera operations, and recording operations. The processing component 1202 may include one or more processors 1220 to execute instructions to complete all or part of the steps of the method described above. In addition, the processing component 1202 may include one or more portions to facilitate interaction between the processing component 1202 and other components. For example, the processing component 1202 may include a multimedia portion to facilitate the interaction between the multimedia component 1208 and the processing component 1202.

The memory 1204 is configured to store various types of data to support the operations at the device 1200. Examples of such data include instructions for any application or method running on the device 1200, contact data, phone book data, messages, pictures, videos, etc. The memory 1204 may be implemented by any type of volatile or nonvolatile storage device or a combination thereof, such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic disk or an optical disk.

The power component 1206 provides power for various components of the device 1200. The power component 1206 may include a power management system, one or more power supplies, and other components associated with generating, managing, and distributing power for the device 1200.

The multimedia component 1208 includes a screen that provides an output interface between the device 1200 and a user. In some embodiments, the screen may include an LCD and a TP. If the screen includes the TP, the screen may be implemented as a touch screen to receive an input signal from a user. The TP includes one or more touch sensors to sense touch, swipe, and gestures on the TP. The touch sensor may not only sense a boundary of a touch or swipe action, but also detect duration and pressure related to the touch or swipe operation. In some embodiments, the multimedia component 1208 includes a front camera and/or a rear camera. When the device 1200 is in an operation mode, such as a photographing mode or a video mode, the front camera and/or the rear camera may receive external multimedia data. Each front camera and each rear camera may be fixed optical lens systems or may have focal lengths and optical zoom capabilities.

The audio component 1210 is configured to output and/or input audio signals. For example, the audio component 1210 includes a microphone (MIC) configured to receive external audio signals when the device 1200 is in an operating mode, such as a call mode, a recording mode, and a voice recognition mode. The received audio signals may be further stored in the memory 1204 or transmitted via the communication component 1216. In some embodiments, the audio component 1210 further includes a speaker for outputting the audio signals.

The I/O interface 1212 provides an interface between the processing component 1202 and a peripheral interface. The peripheral interface may be a keyboard, a click wheel, a button, and the like. These buttons may include, but not limited to: a home button, a volume button, a start button, and a lock button.

The sensor component 1214 includes one or more sensors configured to provide state evaluation for the device 1200 from various aspects. For example, the sensor component 1214 may detect an on/off state of the device 1200 and a relative position of components. For example, the components are a display and a small keypad of the device 1200. The sensor component 1214 may further detect a position change of the device 1200 or one component of the device 1200, the presence or absence of user contact with the device 1200, orientation or acceleration/deceleration of the device 1200, and temperature variations of the device 1200. The sensor component 1214 may include a proximity sensor configured to detect the presence of objects nearby without any physical contact. The sensor component 1214 may also include light sensors, such as CMOS or CCD image sensors, for use in imaging applications. In some embodiments, the sensor component 1214 may also include an acceleration sensor, a gyroscope sensor, a magnetic sensor, a pressure sensor, or a temperature sensor.

The communication component 1216 is configured to facilitate wired or wireless communication between the device 1200 and other equipment. The device 1200 can access a wireless network based on a communication standard, such as WiFi, 2G or 3G, 4G LTE, 5G NR, or a combination thereof. In an exemplary embodiment, the communication component 1216 receives broadcast signals or broadcast related information from an external broadcast management system via a broadcast channel. In an exemplary embodiment, the communication component 1216 further includes a Near Field Communication (NFC) portion to facilitate short-range communications. For example, the NFC portion may be implemented based on a Radio Frequency Identification (RFID) technology, an Infrared Data Association (IrDA), an Ultra-Wide Band (UWB) technology, a Bluetooth (BT) technology and other technologies.

In an exemplary embodiment, the device 1200 may be implemented by one or more Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors, or other electronic elements for performing the above-described methods.

In an exemplary embodiment, a non-transitory computer-readable storage medium including instructions is provided, such as a memory 1204 including instructions. The instructions can be executed by the processors 1220 of the device 1200 to perform the above described methods. For example, the non-transitory computer-readable storage medium may be an ROM, an RAM, a CD-ROM, a magnetic tape, a floppy disk, an optical data storage device, and the like.

Other embodiments of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes may be made without departing from the scope thereof. It is intended that the scope of the present disclosure only he limited by the appended claims.

What is claimed is:

1. A charging circuit, comprising:
   an interface,
   a plurality of batteries connected in series,
   a first charging portion, wherein the first charging portion is connected to the interface and is connected in series with the plurality of batteries,
   a second charging portion, wherein the second charging portion is connected to the interface and is connected in series with at least one battery of the plurality of batteries, and
   a first switching circuit, wherein the first switching circuit is connected with the second charging portion and is configured to switch a conducting state between the second charging portion and the at least one battery,
   wherein in response to the first charging portion being in a charging state and the second charging portion being connected with the at least one battery, the charging circuit is switched to an asynchronous charging mode in which the at least one battery is charged with a charging current different from that of one or more other batteries of the plurality of batteries,
   wherein an input voltage of the first charging portion is the same as an input voltage of the second charging portion, and a ratio of an output voltage of the first charging portion to an output voltage of the second charging portion is equal to a ratio of a number of batteries connected in series with the first charging portion to a number of batteries connected in series with the second charging portion.

2. The charging circuit of claim 1, wherein in response to the first charging portion being in a charging state and the second charging portion being disconnected with the at least one battery, the charging circuit is switched to a synchronous charging mode in which batteries are charged with a same charging current.

3. The charging circuit of claim 1, further comprising:
   a second switching circuit connected with the second charging portion and the first charging portion;
   wherein in response to the charging circuit being in the asynchronous charging mode, the second switching circuit is configured to adjust a magnitude of a charging current for each battery according to a current change condition of the battery.

4. The charging circuit of claim 3, wherein the plurality of batteries comprise a first battery pack and a second battery pack, wherein the first battery pack and the second battery pack are connected in series, and each of the first battery pack and the second battery pack comprises at least one battery;
   the second switching circuit comprises:
   a first switch, wherein the first switch has a first on state and a second on state,
   a fifth switch, wherein a first end of the fifth switch is connected to a negative electrode of the first battery pack and a second end of the fifth switch is grounded,
   a second switch, wherein a first end of the second switch is connected to a positive electrode of the second battery pack and a second end of the second switch is grounded through the fifth switch,
   a third switch, wherein a first end of the third switch is connected to the negative electrode of the second battery pack and a second end of the third switch is connected to the positive electrode of the first battery pack, and a fourth switch, wherein a first end of the fourth switch is connected to the negative electrode of the second battery pack and a second end of the fourth switch is grounded, wherein in response to the first switch being switched to the first on state, the second switch and the fourth switch are configured to switch to an on state, and the third switch and the fifth switch are configured to switch to an off state; and in response to the first switch being switched to the second on state, the second switch and the fourth switch are configured to switch to an off state, and the third switch and the fifth switch are configured to switch to an on state.

5. The charging circuit of claim 4, wherein in response to gradually decreasing of a charging current of the second battery pack and gradually increasing of a charging current of the first battery pack, the first switch is configured to switch from the first on state to the second on state.

6. The charging circuit of claim 5, wherein the first charging portion is electrically connected with the second charging portion, a first one of the first charging portion and the second charging portion is a main charging portion, and a second one of the first charging portion and the second charging portion is an auxiliary charging portion;

in response to charging of the second battery pack being completed, the main charging portion is configured to generate a charging stop instruction, the first charging portion is configured to adjust an output current to zero according to the charging stop instruction, and the second charging portion is configured to charge the first battery pack.

7. The charging circuit of claim 4, wherein in response to voltages of both the first battery pack and the second battery pack being lower than a preset threshold and the first switch being in the first on state, the second charging portion is configured to pre-charge the second battery pack, wherein an output current of the first charging portion is zero.

8. The charging circuit of claim 7, wherein the first charging module is electrically connected with the second charging portion, a first one of the first charging portion and the second charging portion is a main charging portion, and a first one of the first charging portion and the second charging portion is an auxiliary charging portion;

in response to a charging current of the second battery pack reaching a maximum, the main charging portion is configured to generate a charging instruction, and the charging instruction is configured to instruct the first charging portion to pre-charge the first battery pack.

9. The charging circuit of claim 1, wherein the first switching circuit comprises one of a single-pole single-throw switch or a single-pole multi-throw switch.

10. The charging circuit of claim 1, wherein at least one of the first charging portion or the second charging portion is configured to determine an aging state of at least one of the plurality of batteries according to a charging cycle of the battery.

11. A charging method applied to a charging circuit, wherein the charging circuit comprises a plurality of batteries connected in series, the charging method comprising:
acquiring an asynchronous charging instruction; and
controlling, according to the asynchronous charging instruction, at least one battery of the plurality of batteries and one or more other batteries of the plurality of batteries to perform asynchronous charging, so that the at least one battery and the one or more other batteries are not in a maximum charging power stage at a same time, wherein the controlling the at least one battery and the one or more other batteries to perform asynchronous charging comprises:
pre-charging the at least one battery;
judging whether the at least one battery is in a constant current charging stage;
in response to the at least one battery being in the constant current charging stage, controlling, according to a preset asynchronous charging strategy, the one or more other batteries to perform asynchronous charging;
judging whether the at least one battery is in a constant voltage charging stage; and
in response to the at least one battery being in the constant voltage charging stage, controlling, according to the preset asynchronous charging strategy, the one or more other batteries to enter a constant current charging stage.

12. The charging method of claim 11, further comprising:
receiving a charging instruction, wherein the charging instruction comprises one of the asynchronous charging instruction or a synchronous charging instruction; and
judging a type of the charging instruction;
in response to the charging instruction being the asynchronous charging instruction, controlling the at least one battery and the one or more other batteries to perform asynchronous charging; or
in response to the charging instruction being the synchronous charging instruction, controlling the plurality of batteries to perform synchronous charging.

13. The charging method of claim 11, further comprising:
determining an aging state of at least one of the plurality of batteries according to a charging cycle of the battery.

14. An electronic device, comprising:
a processor; and
a memory configured to store instructions executable by the processor,
wherein the processor is configured to:
acquire an asynchronous charging instruction; and
control, according to the asynchronous charging instruction, at least one battery of a plurality of batteries and one or more other batteries of the plurality of batteries to perform asynchronous charging, so that the at least one battery and the one or more other batteries are not in a maximum charging power stage at a same time, wherein the plurality of batteries are connected in series,
wherein in controlling the at least one battery and the one or more other batteries to perform asynchronous charging, the processor is further configured to:
pre-charge the at least one battery;
judge whether the at least one battery is in a constant current charging stage;
in response to the at least one battery being in the constant current charging stage, control, according to a preset asynchronous charging strategy, the one or more other batteries to perform asynchronous charging;
judge whether the at least one battery is in a constant voltage charging stage; and
in response to the at least one battery being in the constant voltage charging stage, control, according to the preset asynchronous charging strategy, the one or more other batteries to enter a constant current charging stage.

15. The electronic device of claim 14, wherein the processor is further configured to:
   receive a charging instruction, wherein the charging instruction comprises one of the asynchronous charging instruction or a synchronous charging instruction; and
   judge a type of the charging instruction;
   in response to the charging instruction being the asynchronous charging instruction, control the at least one battery and the one or more other batteries to perform asynchronous charging; or
   in response to the charging instruction being the synchronous charging instruction, control the plurality of batteries to perform synchronous charging.

16. The electronic device of claim 14, wherein the processor is further configured to:
   determine an aging state of at least one of the plurality of batteries according to a charging cycle of the battery.

17. A non-transitory computer-readable storage medium having stored therein instructions that, when executed by a processor of a device, cause the device to perform the charging method of claim 11.

* * * * *